Jan. 16, 1968  J. CREMER ETAL  3,364,129
APPARATUS FOR USE IN THE MANUFACTURE OF OZONE
Filed Oct. 29, 1963  5 Sheets-Sheet 1

INVENTORS
Joseph Cremer
Friedrich Thomas
BY Connolly and Hutz
ATTORNEYS

——— SINGLE CHAMBER-OZONIZER 45MM DIAMETER.
- - - - DOUBLE SYSTEM-OZONIZER 45MM DIAMETER

INVENTORS
Joseph Cremer
Friedrich Thomas

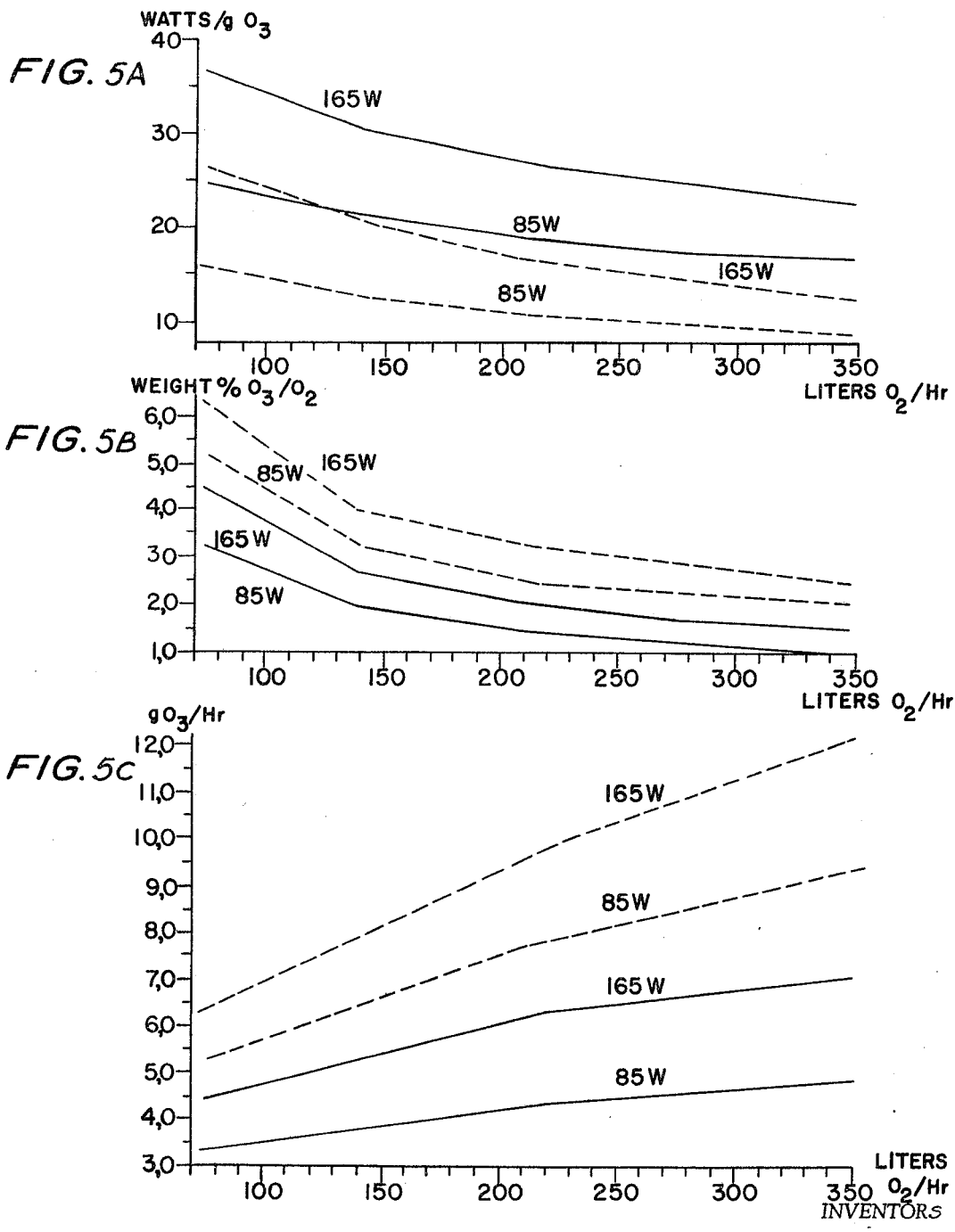

United States Patent Office 3,364,129
Patented Jan. 16, 1968

3,364,129
APPARATUS FOR USE IN THE MANUFACTURE OF OZONE
Joseph Cremer and Friedrich Thomas, Hermulheim, near Cologne, Germany, assignors to Knapsack-Griesheim Aktiengesellschaft, Knapsack, near Cologne, Germany, a corporation of Germany
Filed Oct. 29, 1963, Ser. No. 319,810
Claims priority, application Germany, Nov. 2, 1962, K 48,117
8 Claims. (Cl. 204—321)

ABSTRACT OF THE DISCLOSURE

A tubular type ozonizer having inside its individual, cooled metal tubes, glass or ceramic tubes of appropriate shape suspended as dielectrics to serve concurrently to guide the gases. The outside diametres of the dielectric tubes are slightly smaller than the inside diametres of the metal tubes, so that annular spaces are formed through which the gases to be ozonized are caused to travel. The glass or ceramic tubes are covered on their inside with a metal foil or are provided with an electrically conducting metal film applied thereon by evaporation. As soon as the cooled metal tubes are set to earth potential, the glass or ceramic tubes will form the dielectric and the metal layer applied to their insides can be connected to serve as a counter-electrode or high tension electrode.

---

The present invention provides an apparatus for use in the continuous manufacture of ozone from oxygen or oxygen-containing gases in the silent electrical discharge.

Ozone is usually prepared commercially by silent electrical discharge since the low energy density of such discharge is a decisive prerequisite to favorable setting of the strongly temperature responsive formation or decomposition equilibrium of the ozone, and since flowing gases permit simple and continuous operation. Varied times of stay of the gases in the discharge zone enable, for example, the ozone concentration, the amount of ozone produced per unit of time and the specific consumption of electrical power to be influenced. These values can also be influenced by purely structural means and by varying the electrical power supplied.

The technical design of ozonizers is primarily required to meet the demands for large-surfaced electrodes permitting low energy density. Generally, plate-type or tubular type electrodes are used, a large number of electrode pairs being connected in parallel circuit relation both as regards electrical connection and flow of gas to thereby enlarge the whole efficient surface. To stabilize the discharge, an appropriate dielectric, for example glass or ceramic, is provided. Since a considerable portion of the electrical energy supplied is also set free in the silent discharge as waste heat, it is necessary to provide for efficient cooling of such devices in order to avoid noteworthy losses of ozone by thermal decomposition thereof, efficient cooling being achieved either by indirect outside water-cooling of the apparatus or by direct cooling using a pre-cooled gas as the starting material.

The art admittedly provides the means for compact design and construction of plate type ozonizers having, for example, round or rectangular plates, due to the simple shape conferred upon the electrodes and the dielectric. Efficient cooling and more particularly uniform gas conduct involve, however, considerable difficulties, especially when large units, so-called batteries, are concerned.

The tubular type ozonizer on the other hand admittedly occupies more space, but it does not involve the aforesaid difficulties and it offers the advantage that reliable tubular heat exchanger systems can be used therein. In such system, for example, inside the individual, cooled metal tubes, glass or ceramic tubes of appropriate shape are suspended as dielectrics to serve concurrently to guide the gases. The outside diametres of the dielectric tubes are slightly smaller than the inside diametres of the metal tubes, so that annular spaces are formed through which the gases to be ozonized can be caused to travel. The glass or ceramic tubes are covered on their inside with a metal foil or are provided with an electrically conducting metal film applied thereon by evaporation. As soon as the cooled metal tubes are set to earth potential, the glass or ceramic tubes will form the dielectric and the metal layer applied to their insides can be connected to serve as a counter-electrode or high tension electrode.

Numerous variants of the individual constructional elements used in these two basic systems have already been described which have the common goal to provide elements of fairly simple and permanent design enabling simultaneously improved substance and electric yields to be obtained.

The present invention now provides an apparatus which in space requirements, low specific electric energy consumption and gas throughput corresponds to the conventional systems of tubular ozonizers, but enables approximately double the ozone concentration and thus double the amount of ozone produced per unit of time to be obtained. Such increase in the substance and electrical yields is obtained with the use of an apparatus comprising an outer metal tube, which consists of corrosion-resistant metal, is closed at its lower end and cooled, an inner dielectric tube, which consists of dielectrically efficient, corrosion-resistant material, for example glass or ceramic, is disposed inside said outer metal tube and co-axially distanced therefrom, and an innermost metal tube, which consists of corrosion resistant metal, is disposed inside the said inner dielectric tube, coaxially distanced therefrom and closed at its lower end, every three such tubes forming such double system being closed at their upper ends by providing means for holding such tubes, for reciprocally centering them, for connecting the counter-electrode, for supplying the starting gas and for withdrawing the reaction mixture ultimately produced.

The term "double system" as used herein should always be understood in the sense described above.

In one embodiment of the present apparatus, the distance, measured radially, between the inside of the outer metal tube and the outside of the dielectric tube is equal to the distance, measured radially, between the inside of the dielectric tube and the outside of the innermost metal tube.

According to a further embodiment of the present invention, the distance, measured radially, between the inside of the outer metal tube and the outside of the dielectric tube is greater than the distance, measured radially, between the inside of the dielectric tube and the outside of the innermost metal tube.

The width, measured radially, of the discharge spaces varies between 0.5 to 5.0 mm., preferably 1.0 to 3.0 mm., the discharge spaces being formed, respectively, between the inside of the outer metal tube and the outside of the dielectric tube and between the inside of the dielectric tube and the outside of the innermost metal tube.

In the vicinity of their upper rims, the outer and innermost metal tubes are provided with calibrated overflow openings.

At its upper end, the dielectric tube is closed in gas-tight manner with a centering flange provided with a centered borehole, the flange being positioned gastight in the outer metal tube and the inner metal tube being fastened thereto in gastight manner.

A collecting chamber provided with one or more gas intake openings and one gas outlet opening is mounted on the centering flange.

The gas-tight disposition of a ring or frame having a gas intake opening attached laterally thereto between the bottom portion of the tube, which serves to fasten the outer metal tube in the reservoir for the coolant, and the collecting chamber results in the formation of gas intake chamber for the starting gas.

According to a further embodiment of the present invention a number of double systems consisting each of an outer metal tube, an inner dielectric tube and an innermost metal tube is disposed in a container for coolant common to all double systems, connected to an intake gas distributor common to all double systems and connected to a gas outlet chamber common to all double systems.

According to a still further embodiment of the present invention a number of double systems each comprising an outer metal tube, an inner dielectric tube and an innermost metal tube with the attendant centering flanges is disposed in a coolant container common to all double systems, the outer metal tube and the innermost metal tube of the first of such double systems disposed nearest to the direction of the starting gas intake being provided in the vicinity of their upper rims with overflow openings, the attendant centering flange is disposed in a starting gas intake chamber having an intake opening for supplying the starting gas, and provided with an outflow channel starting inside the innermost metal tube, the second and the following double systems are maintained in position by means of centering flanges which are provided with an overflow channel connected to the outflow channel of the respective preceding double system and projecting into the annular space formed between the outer metal tube, which in this embodiment is designed without overflow openings, and the dielectric tube, and the outflow channel of the last double system is extended so as to project into a gas outlet chamber equipped with a discharge opening.

An electrically insulated high tension supply line is extended through the attendant centering flange into the innermost metal tube of every double system, the supply line being followed by a fuse cut-out, whose contact springs which project downwardly produce an electrically conductive connection to the respective innermost metal tube, whereas the outer metal tubes are set to earth through the coolant container common to all double systems, the earth serving as the return circuit.

The apparatus of the present invention is shown diagrammatically in longitudinal section in the accompanying drawings in which:

FIGS. 5A, 5B and 5C represent diagrams of similar test results obtained for a diameter of the outer metal tube of 45 mm.

Figure 1:
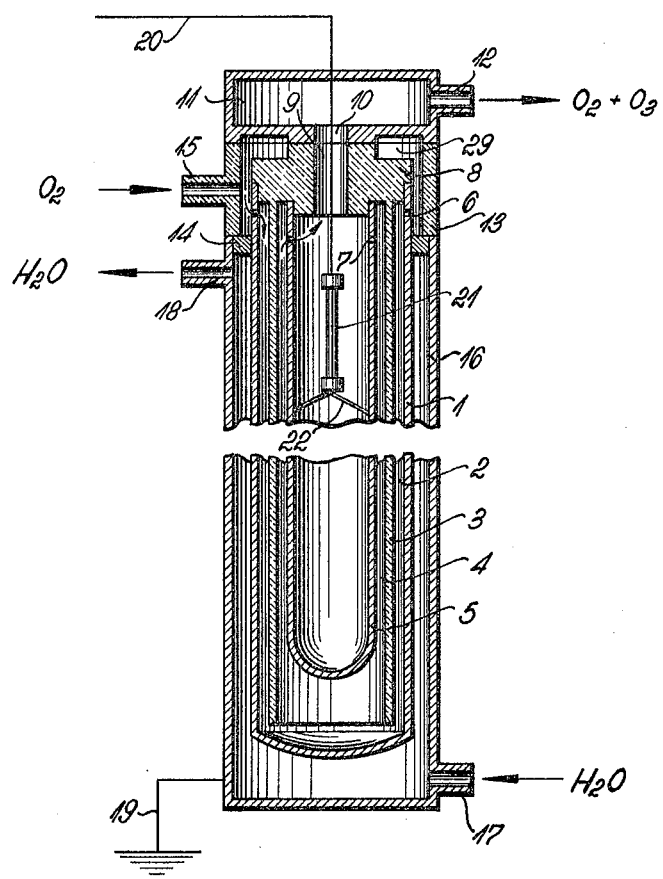
FIG. 1 represents a longitudinal section through a single double system.

In its simplest mode of execution, the apparatus of the present invention comprises a single double system as shown diagrammatically in FIG. 1 in longitudinal section. The double system comprises essentially the outer metal tube 1 closed at its lower end, the innermost metal tube 5, which is closed at its lower end and placed coaxially to the outer tube 1 and the inner dielectric tube 3 which is open at its lower end and disposed coaxially to tubes 1 and 5 and therebetween with the formation of discharge zones 2 and 4.

The metal tubes 1 and 5 are closed at their lower ends and provided with overflow openings 6 and 7 disposed near the upper rim of these tubes. Metal tubes 1 and 5 consist of a material resistant to ozone, for example chrome-nickel steel (V4A-steel—stainless steel). The dielectric tube 3 on the other hand is made of high-tension resistant and ozone-resistant material, for example glass or ceramic.

These three tubes are fastened in a centering flange 8 made of the same material as the dielectric tube 3. As indicated in FIG. 1, the centering flange 8 and the dielectric tube 3 may be one-piece made or the centering flange 8 may be provided with an annular recess and the dielectric tube 3 as a separate part adapted thereto. The centering flange 8 is provided with a centered boring 9 which in the embodiment shown in FIG. 1 is extended by means of a boring 10 and thus projects into collecting chamber 11, having a discharge outlet 12 for the resulting oxygen-ozone mixture.

The double system is inserted in a coolant container 16, the coolant, for example water, being supplied thereto through short pipe 17 and removed therefrom through short pipe 18. The top portion of coolant container 16 carries a collar 14 welded thereon to which the outer metal tube 1 is fastened by welding, soldering or rolling.

A hollow cylinder 13 of high tension resistant and ozone resistant material, for example glass or ceramic, is placed between the collar 14 and storage chamber 11, the hollow cylinder 13 being provided with short gas intake pipe 15 for supplying the starting gas to be processed (oxygen and/or air) and forming gas intake chamber 29. The oxygen and/or air introduced into gas intake chamber 29 first travels through overflow openings 6 as indicated by the arrow in FIG. 1 to the outer discharge space 2 formed between the outer metal tube 1 and the dielectric tube 3, then leaves the said discharge space 2 after the direction of flow has been inversed at the lower edge of the dielectric tube 3, ascends in the inner discharge space 4, penetrates through overflow openings 7 into the inside of the inner metal tube 5, leaves the latter through bore openings 9 and 10 to ultimately arrive in collecting container 11 from which the reaction mixture of $O_2$ and $O_3$ obtained is removed through outlet opening 12.

During operation, a coolant, for example water, is caused to flow through coolant container 16, the coolant being introduced through short inlet tube 17 and being removed through short outlet tube 18.

The electric high voltage is supplied to the system through circuit 20 projecting through storage chamber 11 and the centered borings 9 and 10 of centering flange 8 and terminating in a fuse cut-out 21, the contact springs 22 of which ensure the current transfer to the innermost metal tube serving as the high tension electrode. Parts 20, 21 and 22 which come into contact with ozone consist of ozone-resistant material, for example chrome-nickel steel (V4A-steel—stainless steel).

The counter electrode is the outer metal tube 1 which is electrically connected via the coolant container 16 and through conduit 19 to the earth as the return circuit.

A prerequisite to favorable substance and electric yields inter alia dictates optimal dimensioning of the outer discharge space 2 and the inner discharge space 4. To this end, the distances, measured radially, between the inside wall of the outer metal tube 1 and the outside wall of the dielectric tube 3 and between the inside wall of the dielectric tube 3 and the outside wall of the innermost metal tube 5, that is to say the widths of the discharge spaces 2 and 4, may be designed so as to be equal or unequal to each other.

The tolerances to be observed in dimensioning the outer metal tube 1, the innermost metal tube 5 and the inner dielectric tube 3 should be kept within narrow limits. Favorable widths of the discharge spaces 2 and 4, measured radially, are within the range of 0.5 to 5.0 mm., preferably 1.0 to 3.0 mm., the individual widths of discharge spaces 2 and 4 being designed so as to be equal or unequal to each other.

When the direction of flow of the gas to be ozonized runs, for example, from the inner discharge space 4 to the outer discharge space 2, i.e. in a direction opposite to that indicated in FIG. 1 by the arrows drawn through overflow openings 6 and 7, the incoming gas is heated to a certain temperature but on passing through the outer cooled discharge space 2 is maintained appromixately at that temperature in spite of further waste heat being evolved in discharge space 2. In this case, it is advantageous to design the inner discharge space 4 to have a volume smaller than the outer discharge space 2 which results in an increased rate of flow so that longer residence times of the ozonized gas in a zone having a higher temperature can be avoided.

The overall length of the double systems is limited by the technical and commercial facilities available for producing straight tubes since otherwise it is not ensured that uniform distances can be maintained over the total length. Experience has shown that tubes having a length of up to 3 meters are sufficiently straight without special measures being required to be taken.

To increase the quantity of ozone produced on a commercial scale per unit of time, a more or less great number of double systems of the type disclosed in the present invention is connected in parallel circuit relation as regards flow of gas. In order to obtain higher ozone concentrations, for example on a laboratory scale, it is advantageous to connect a number of double systems in series relationship with respect to the flow of gas. Seen electrically, the double systems are connected in parallel circuit relation immaterial of parallel or series circuit relationship of the flowing gas.

Figure 2:
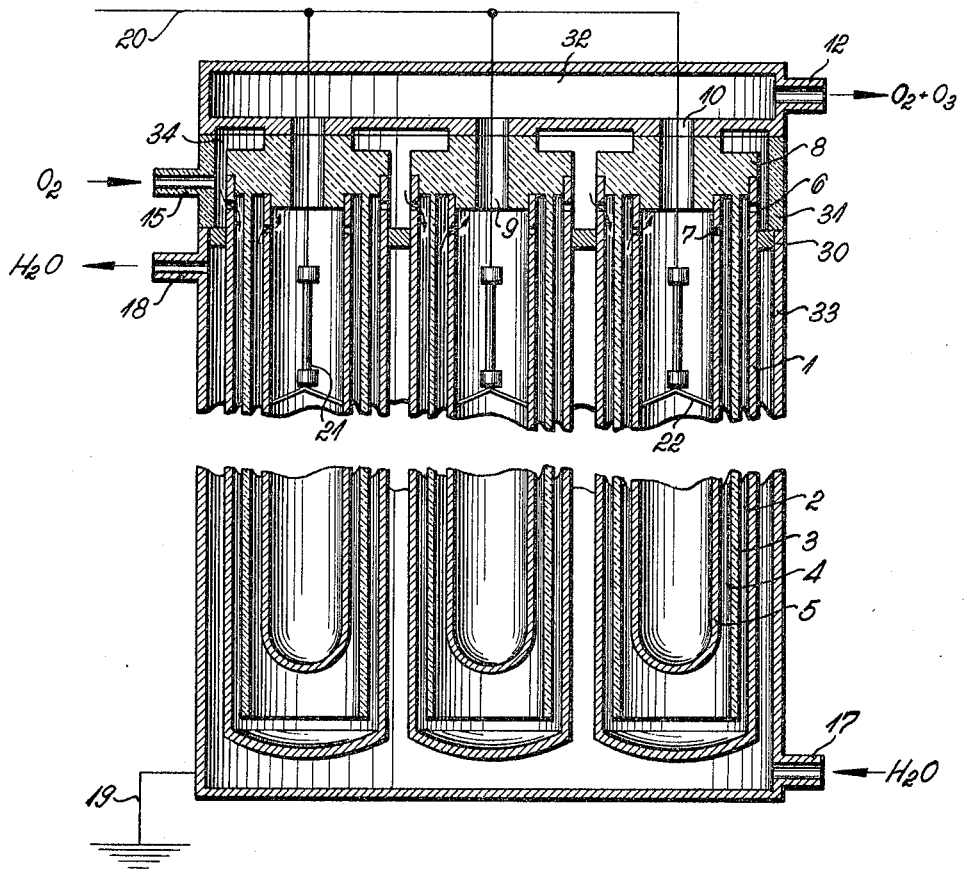
FIG. 2 represents a longitudinal section through three double systems connected in parallel circuit relation as regards flow of gas and electric circuit.

FIG. 2 represents an arrangement comprising three double systems which are connected in parallel circuit relation with respect to the flowing gas. Identical reference numerals design the same parts as in FIG. 1. The double systems are equally designed and correspond to the mode of execution represented in FIG. 1. In FIG. 2, they are mounted in a coolant tank 33 closed at its upper end by tube bottom 30. The outer metal tubes are fastened to the borings in said tube bottom 30 by rolling, welding or soldering. The centering flange 8 carries the collecting tank 32 for the resulting O₂ plus O₃-mixture, which tank is common to the three double systems. A frame 31 is inserted in gastight manner between the lower side of storage tank 32 and the upper side of the tube bottom 30 so that gas intake chamber 34 common to the three double systems is formed.

In order to ensure uniform distribution of the starting gas over all double systems present, a slight super-pressure, for example of about 10 to 50 mm. water column, is maintained in intake chamber 34 with respect to the pressure prevailing in the double systems. The difference in pressure is adjusted to the desired value by calibrating the overflow openings 6 and 7 near the upper rim of the outer metal tube 1 or of the innermost metal tube 5. The free cross-sectional area of the overflow openings 6 and 7 depends on the rate of gas required to be put through and varies within the range of one to several square millimeters.

Since the intake chamber 34 and the collecting chamber 32 are disposed one above the other and have a common wall which in a manner analogous to the walls of the coolant tank 33 need not be pressure-resistant, it is possible to design such apparatus even for higher gas pressure with relatively little expense of material.

Especially in the described parallel circuit relation of a number of double systems which, as mentioned above, are also in parallel electric circuit relation, it has proved advantageous to electrically secure each individual double system. If short circuits are produced, for example as a result of dielectric breakdown, the individual cut-outs will avoid greater destruction, failure of the apparatus and damage to the transformer. The supply of power to the innermost metal tube 5 from a high tension transmission line 22 through a fuse cutout 21 and contact springs 22 has already been described above. When the cutout fuses, its parts, inasmuch as they are not evaporated, will fall onto the bottom of metal tube 5 where they remain until the whole apparatus is overhauled when the occasion arises.

The failure of one or more double systems does not result in interruption of work but merely in a minor reduction of the total yield.

Figure 3:
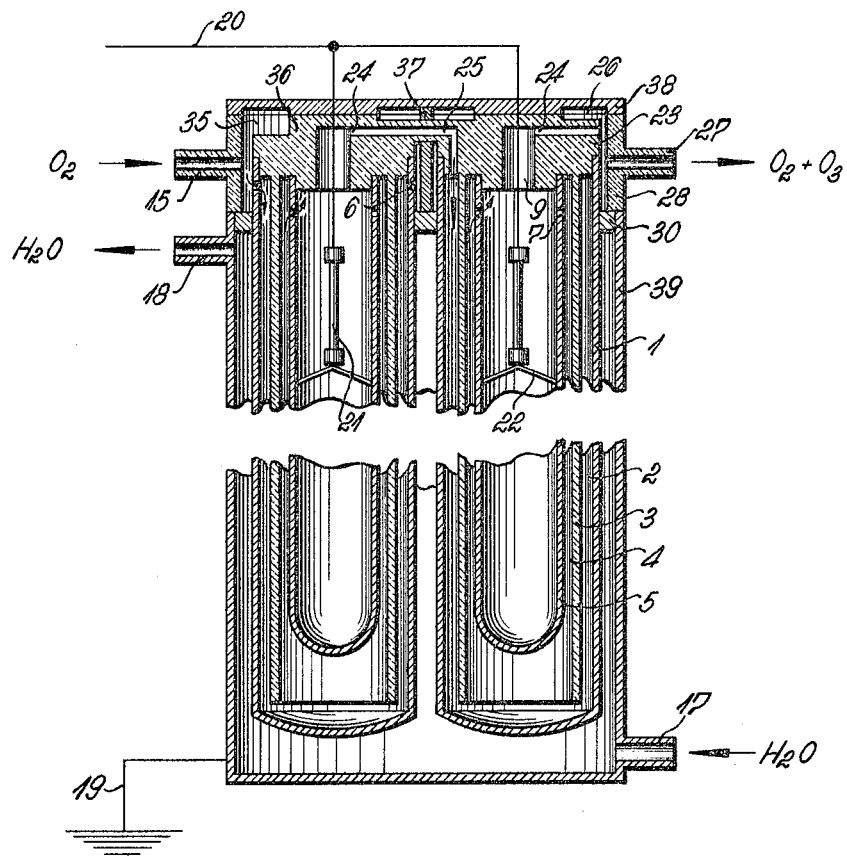
FIG. 3 represents a longitudinal section through two double systems connected in series relationship with respect to the flowing gas and connected electrically in parallel circuit relation.

FIG. 3 represents an apparatus comprising two double systems in series circuit connection with respect to the flowing gas, which are placed in common coolant container 39. The outer, cooled discharge spaces 2 should have a larger volume than the inner discharge spaces 4 not provided with special cooling means. This has the effect that the time of stay of the flowing gas in the uncooled inner discharge space 4 is shorter than the time of stay in the cooled, outer discharge space. The tendency of the ozone to undergo thermal decomposition is thereby diminished. The starting gas in intake chamber 35 enters through overflow openings 6 into the outer discharge space 2, then flows, after the direction of flow has been inversed at the lower edge of the dielectric tube 3, into the inner discharge space 4 and from the latter through overflow openings 7 into the interior of the dielectric tube 3. The gas then travels as ozonized oxygen through boring 9 in centering flange 8, the outlet channel 24 and finally arrives through intake channel 25 in the outer discharge space 2 of the following second double system. After deflection around the lower edge of the dielectric tube, the ozonized oxygen flows through the inner discharge space 2, through overflow openings 7, through boring 9 in the centering flange 23 and through outlet channel 24 to arrive in outlet chamber 26, from which it can be withdrawn with a certain ozone content through outlet pipe 27. When the double systems are connected in series relation, the intake chamber 35 and the outlet chamber 26 are formed by frame parts 28 inserted in gastight manner between the common tube bottom 30 and a common cover plate 38 seated on centering flange 36 and by partition walls inserted between two successive double systems.

Series connection of double systems is especially advantageous for producing higher ozone concentrations.

The double systems and the various modifications thereof described above offer the advantage over the conventional tubular ozonizers to obviate difficult and thus costly treatment of the glass or ceramic tube, for example, the difficulty involved in sealing thereto metal conduits for current supply and/or in metallizing the inside of the dielectric tube, for example by evaporating metal thereon in vacuo or by precipitating metal by chemical means. There may now be used instead slightly adapted commercially available dielectric and metal tubes.

Destruction of the glass or ceramic tube merely requires replacement, whereas the metal tubes remain unaffected.

A further advantage is offered by the outer metal tube closed at one end which is used for inversing the direction of flow. In contradistinction to the normal heat exchanger arrangements, the double system of the present invention, clamped unilaterally, may be suspended freely in the container for the coolant without changes in the dimensions accruing from alternating temperatures giving rise to strain in the material.

It should also be noted that the freely emerging supply and discharge means of the gases at one and the same end of the apparatus results in advantages in construction, mounting and maintenance.

For completeness' sake, it is mentioned that in order to still more improve the utilization of space and material, attempts have been made by repeating the telescoping of further metal and dielectric tubes to lengthen the path of the flowing gas in the electric field in the free interior of the inner metal tube in order to develop the double systems to systems comprising four discharge spaces.

However, in order to at least approximately obtain the expected improved yield in such arrangement, it was necessary to provide further means for withdrawing waste heat, either by using colder cooling water or colder starting gas, alone or in combination. Investigations on the economy will be influenced by the availability of cheap cooling energy, for example liquid oxygen, which after evaporation could be used as the starting gas. It should, however, be borne in mind that, in a manner analogous to the general experience gained in ozone manufacture in the silent electric discharge, better yields can also be obtained with the present double systems at lower operating temperatures.

Figure 4A:
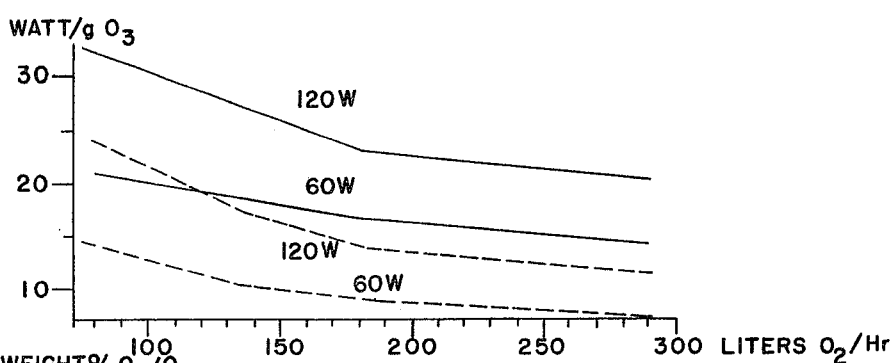
FIGS. 4A, 4B and 4C represent diagrams of the results obtained in tests comparing the ozonizer of the present invention with ozonizers of conventional design for a diameter of the outer metal tubes of 35 mm.
Figure 4B:
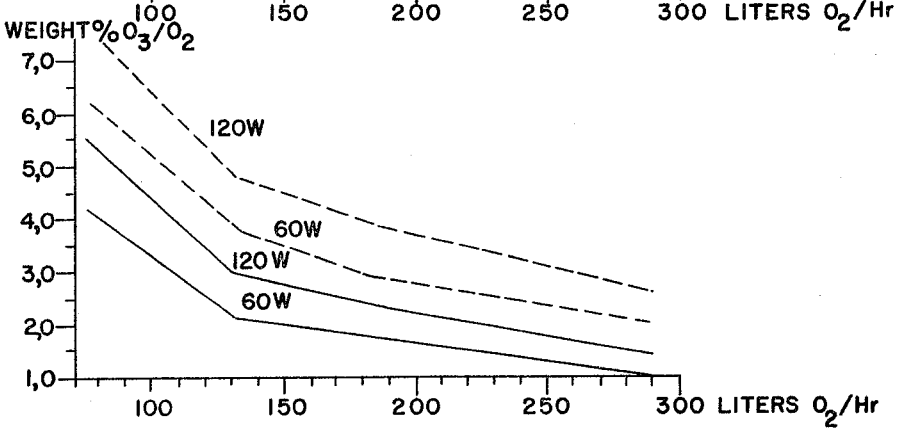
Figure 4C:
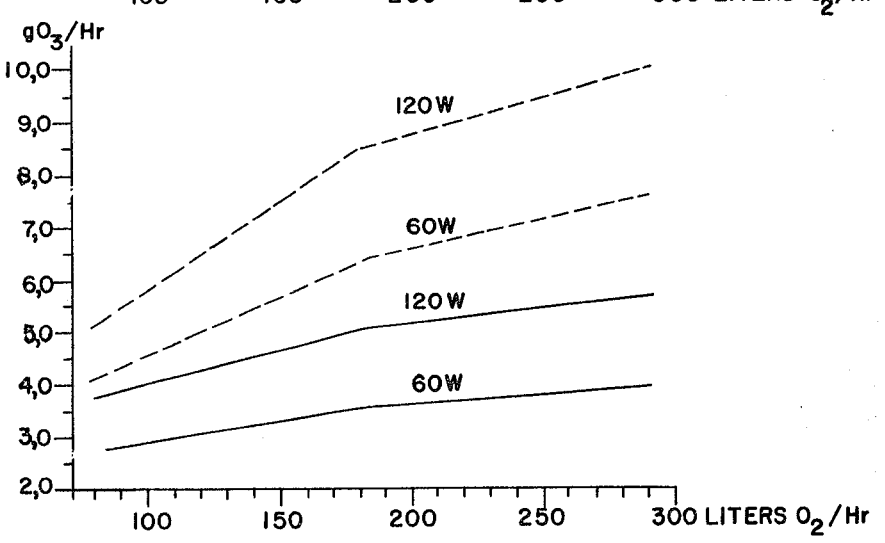

The electrical and substance yields are indicated in watt/gram $O_3$ on FIGS. 4A and 5A, gram $O_3$/hr. on FIGS. 4C and 5C and weight percent $O_3/O_2$ on FIGS. 4B and 5B.

The data indicated in the following Tables 1 and 2 for the consumption of electrical power include about 30% total loss observed in the laboratory high tension transformer used on FIGS. 4A, 4B and 4C illustrates the data in Table 1 and FIGS. 5A, 5B and 5C illustrate the data in Table 2.

In ozonizers designed for commercial use (parallel connection of a plurality of units) and transformers, for example, of 20 k.v.a., the total losses have been experienced to be reduced to 8 to 10%, so that the power needed in industry may be supposed to be about 20% lower and the electrical yield accordingly higher.

The results obtained clearly demonstrate the superiority of the apparatus of the present invention to the conventional ozonizers.

TABLE 1

[Apparatuses: outer metal tube, 35 mm. in diameter; tube lengths, 1,000 mm.]

| Watt | L. $O_2$/h. | Single space ozonizer | | | Double-system type ozonizer | | |
|---|---|---|---|---|---|---|---|
| | | Watt/g. $O_3$ | G. $O_3$/h. | Weight percent $O_3/O_2$ | Watt/g. $O_3$ | G. $O_3$/h. | Weight percent $O_3/O_2$ |
| 60 | 50 | 21 | 2.8 | 4.0 | 14 | 4.2 | 6.0 |
| 60 | 100 | 19 | 3.1 | 2.4 | 11 | 5.3 | 4.0 |
| 60 | 150 | 17 | 3.5 | 1.8 | 9 | 6.4 | 3.0 |
| 60 | 200 | 16 | 3.8 | 1.4 | 8.5 | 7.0 | 2.5 |
| 60 | 250 | 15 | 4.0 | 1.1 | 8 | 7.5 | 2.1 |
| 120 | 50 | 32 | 3.8 | 5.4 | 23 | 5.2 | 7.4 |
| 120 | 100 | 27 | 4.4 | 3.0 | 18 | 6.8 | 5.0 |
| 120 | 150 | 23 | 5.1 | 2.4 | 14 | 8.5 | 4.0 |
| 120 | 200 | 22 | 5.4 | 2.0 | 13 | 9.2 | 3.4 |
| 120 | 250 | 21 | 5.7 | 1.6 | 12 | 9.9 | 2.8 |

TABLE 2

[Apparatuses: outer metal tube, 45 mm. in diameter; tube lengths, 1,000 mm.]

| Watt | L. $O_2$/h. | Single space ozonizer | | | Double-system type ozonizer | | |
|---|---|---|---|---|---|---|---|
| | | Watt/g. $O_3$ | G. $O_3$/h. | Weight percent $O_3/O_2$ | Watt/g. $O_3$ | G. $O_3$/h. | Weight percent $O_3/O_2$ |
| 85 | 70 | 25 | 3.3 | 3.3 | 16 | 5.2 | 5.3 |
| 85 | 140 | 21 | 3.8 | 2.0 | 13 | 6.5 | 3.3 |
| 85 | 210 | 19 | 4.3 | 1.5 | 11 | 7.7 | 2.6 |
| 85 | 280 | 18 | 4.6 | 1.2 | 10 | 8.5 | 2.2 |
| 85 | 350 | 17 | 4.9 | 1.0 | 9 | 9.4 | 2.0 |
| 165 | 70 | 37 | 4.5 | 4.5 | 26 | 6.2 | 6.4 |
| 165 | 140 | 31 | 5.3 | 2.8 | 21 | 7.8 | 4.0 |
| 165 | 210 | 27 | 6.1 | 2.1 | 17 | 2.6 | 3.3 |
| 165 | 280 | 25 | 6.7 | 1.7 | 15 | 10.7 | 2.9 |
| 165 | 350 | 23 | 7.1 | 1.5 | 13 | 12.2 | 2.6 |

*Experimental results*

Experiments were made using a tubular ozonizer of known design (so-called single space ozonizer) and the double system-type ozonizers described above, and the results obtained were compared. The two types of apparatus used had outside tube diametres of 35 and 45 mm., respectively, and a length of 1000 mm. each.

The volumes of the apparatuses (diametre and length of the outer tube), throughput of starting gas (litres $O_2$/hr.) and electric power (watt) were identical in the respective experiments as the prerequisites to comparison of the yields obtained in the two systems.

We claim:

1. In an apparatus for the continuous manufacture of ozone from at least one member selected from the group consisting of oxygen and oxygen-containing gases in the silent electrical discharge between two electrodes, formed of an outer metal tube of ozone-resistant metal, which serves as the first electrode and is connected with a high tension source, an inner dielectric tube formed of dielectrically efficient material, disposed inside the said outer metal tube, coaxially spaced therefrom and open at its lower end, and an innermost metal tube of ozone resistant material, which serves as the second electrode connected to earth, is disposed inside the said inner dielectric tube and coaxially spaced therefrom, said three tubes forming a double system and being closed by means for holding such tubes, reciprocally centering them, and supplying and discharging gas thereto, the improvement which comprises said three tubes being constructed and arranged so that the distance, measured radially, between the inside of the outer metal tube and the outside of the dielectric tube, within which distance an outer annular discharge space is formed, is greater than the distance, measured radially, between the inside of the dielectric tube and the outside of the innermost metal tube, within which latter distance an inner annular discharge space is formed and means connecting said annular discharge spaces in series flow relationship with each other.

2. An apparatus as claimed in claim 1, wherein the two electrodes are metal tubes closed at one end and provided at the other end with openings providing communication between the discharge chambers and gas inlets and gas outlets, and the openings having cross sectional areas smaller than the cross sectional area of the gas inlets and gas outlets and the discharge chambers.

3. An apparatus as claimed in claim 1, wherein the width, measured radially, of the outer and inner annular discharge spaces is within the range of about 0.5 to 5.0 mm.

4. An apparatus as claimed in claim 1, wherein the width, measured radially, of the outer and inner annular discharge spaces is within the range of about 1.0 to 3.0 mm.

5. An apparatus as claimed in claim 1, comprising a starting gas intake chamber which is formed by a collecting tank, a coolant container, overflow openings in the outer metal tube, a tube bottom portion serving to fasten the outer metal tube to the coolant container and the collecting tank, a ring having an intake pipe attached thereto being inserted between the tube bottom portion and the collecting tank, and the said gas intake chamber surrounding the overflow openings disposed in the outer metal tube.

6. An apparatus as claimed in claim 1, wherein a plurality of double systems each comprising an outer metal tube, an inner dielectric tube and an innermost metal tube and the attendant means for holding and centering the tubes are connected in parallel circuit relation with respect to the flowing gas by being placed in a coolant container common to all double systems and are also connected to a gas intake chamber common to all double systems and to a collecting tank common to all double systems.

7. An apparatus as claimed in claim 1, wherein a plurality of double systems each comprising an outer metal tube, an inner dielectric tube and an innermost metal tube and the attendant means for holding and centering the tubes comprising centering flanges is placed in a coolant container common to all double systems connected in series circuit relation with respect to the flowing gas by providing centered borings in the centering flanges attached to the double systems and extending such borings to project each into a gas outlet channel, which gas outlet channels, except for the gas outlet channel of the last double system, are all extended to project into the upper end portion of the outer discharge space formed in the following double system and limited by the respective centering flange, the outer metal tubes of the double systems successive to the first double system being free from overflow openings and the gas outlet channel of the last double system projecting into a gas outlet chamber provided with a gas outlet pipe.

8. An apparatus as claimed in claim 1, wherein an electrically insulated high tension supply line is extended through the respective holding and centering means to the innermost metal tube of each double system, the high tension supply line being provided with a successive fuse cut out having contact springs projecting downwardly which produce an electrically conductive connection to the respective innermost metal tube, and the outer metal tubes are set to earth through the coolant container common to all double systems, the earth serving as the return line.

References Cited

UNITED STATES PATENTS

| | | | |
|---|---|---|---|
| 1,312,484 | 8/1919 | Knox et al. | 204—320 |
| 1,322,907 | 11/1919 | Klots | 204—320 |
| 1,577,747 | 3/1926 | Hartman | 204—320 |

FOREIGN PATENTS

| | | |
|---|---|---|
| 41,297 | 3/1910 | Austria. |
| 19,146 | of 1912 | Great Britain. |

ROBERT K. MIHALEK, *Primary Examiner.*

HOWARD S. WILLIAMS, *Examiner.*